No. 855,139. PATENTED MAY 28, 1907.
J. R. SCOTT.
HANDHOLD STRAP FOR AUTOMOBILES.
APPLICATION FILED OCT. 29, 1906.

WITNESSES:

INVENTOR
John R. Scott
BY
Geo. H. Strong.
ATTORNEY

UNITED STATES PATENT OFFICE.

JOHN R. SCOTT, OF OAKLAND, CALIFORNIA.

HANDHOLD-STRAP FOR AUTOMOBILES.

No. 855,139.   Specification of Letters Patent.   Patented May 28, 1907.

Application filed October 29, 1906. Serial No. 341,015.

*To all whom it may concern:*

Be it known that I, JOHN R. SCOTT, a citizen of the United States, residing at Oakland, in the county of Alameda and State of California, have invented new and useful Improvements in Handhold-Straps for Automobiles, of which the following is a specification.

My invention relates to an attachment to a motor car whereby the occupants may be secured against being thrown out by the sudden stoppage of the car, or in case of a collision or accident, where the collision or accident is not so serious as actually to wreck or over turn the car; and it pertains especially to a handhold or strap suitably anchored to the bottom or back of the seat.

Figure 1:
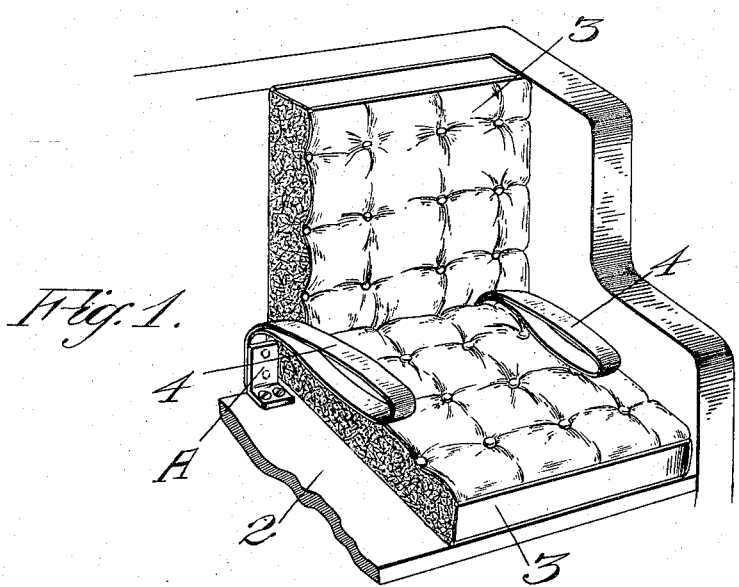
Figure 2:
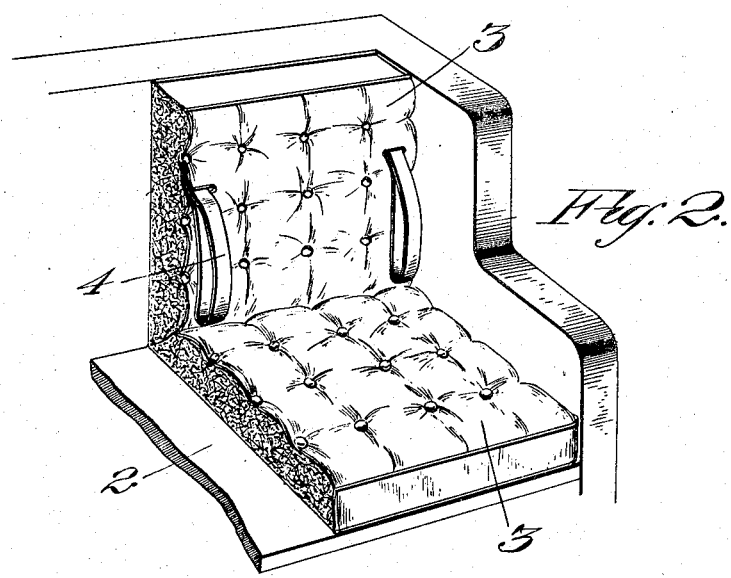

Having reference to the accompanying drawings—Figure 1 shows the application of my hand-hold strap and bracket for a vehicle seat. Fig. 2 shows the hand-hold straps attached to the back of the seat.

Many accidents to motorists occur by cars suddenly stopping or by being struck by other vehicles or meeting with mishaps short of wrecking or overturning the car; the occupants having nothing to hold on to are slid off the slippery seats and projected out of the car; whereas if any proper means had been provided by which even a temporary support could have been afforded, the occupants would not have left their seats.

My invention has its embodiment in either of two preferred forms, although, doubtless the invention is capable of being practiced in a variety of ways.

As shown in Fig. 1, A represents a metal bracket adapted to be secured to the bottom of the seat 2, and to extend up back of the usual removable cushions 3. This bracket may be of any suitable height, but preferably for the sake of comfort and the appearance of the vehicle it need not extend above the top of the seat cushions. This bracket forms an anchorage for the strap 4; the strap being looped and riveted or otherwise firmly secured at its ends to the back of the bracket. The use of the bracket in conjunction with the strap allows the device to be attached to any vehicle seat, and no matter what tension may be brought on the straps the position of the cushions will not be disturbed, since all the strain is brought on the brackets.

There may be any number of these brackets and straps constituting suitable handholds as is desired. Preferably where used in a tonneau adapted to accommodate two or more persons, these hand-holds will be arranged in pairs and suitably spaced, so that a person may have one of these straps extending forward and preferably somewhat in advance of the hips, so as to be conveniently grasped. In fact the straps may be of any suitable length to extend in front of the occupant, or to allow his arms to be passed through the loops of the straps; this matter of the length and the disposition of the straps, or the mode of using them being immaterial as far as the invention itself is concerned.

In Fig. 2, the straps are shown connected to the back of the seat at suitable intervals so that they may be extended forward between the occupants or at either side of any occupant.

Having thus described my invention, what I claim and desire to secure by Letters Patvent is—

The combination with a vehicle-seat, of bracket-members secured to the bottom of the seat and extending up back of the cushions, and hand-hold straps secured to these brackets.

In testimony whereof I have hereunto set my hand in presence of two subscribing witnesses.

JOHN R. SCOTT.

Witnesses:
C. S. MACMULLAN,
FRANK S. ADAMS.